CONSTANT LEVEL LOADING OF F.M. MODULATOR

Filed June 21, 1967

INVENTOR
MARVIN R. WACHS
BY Sughrue, Rothwell, Mion, Zinn & Macpeak
ATTORNEYS 3,477,042

CONSTANT LEVEL LOADING OF F.M. MODULATOR

Marvin R. Wachs, Bowie, Md., assignor to Communications Satellite Corporation, a corporation of Washington, D.C.

Filed June 21, 1967, Ser. No. 647,857
Int. Cl. H03c 3/00
U.S. Cl. 332—16 8 Claims

ABSTRACT OF THE DISCLOSURE

A system for use in F.M. communication systems which maintains substantially constant carrier dispersion despite variation of the message load. An F.M. carrier has an assigned bandwidth in accordance with the maximum number of channels allocated for modulating the carrier. Since the carrier power is set in the transmitter, the power spectral density and the carrier dispersion or occupied bandwith depends upon the number of channels in use at any time. A locally generated waveform, having a frequency outside of the multiplex baseband, is varied in amplitude in accordance with the average of composite message and added to the composite message prior to modulating the F.M. carrier. As a consequence, the carrier dispersion and the peak power spectral density of the transmitter output remains substantially constant independent of the message loading.

PRIOR ART

In F.M. communication systems a given number of channels may be assigned to modulate a single carrier. For example, one hundred and twenty telephone lines may be assigned to a single carrier. The carrier power is set in accordance with known considerations and international regulations resulting in a specific power density spectrum of the transmitter output when there is a full message load, i.e., all 120 channels are in use. The spectrum is spread over an assigned bandwidth.

The problem, to which the present invention is directed, results when there is less than full message loading of the F.M. carrier. For example, if there are only 60 of the allocated telephone lines being used at any one time, the composite message fed into the F.M. modulator will disperse the carrier over much less than the assigned bandwidth. Since the power output is not dependent upon the message load, the total power, being spread over a smaller bandwidth has an increased peak power spectral density. Thus as the number of channels in use decreases the bandwidth narrows and the total power is confined to a narrower bandwidth region resulting in much greater peak power spectral density at the center frequencies.

International regulations are set down concerning the maximum allowable flux density at the surface of the earth. The regulations are based on the watts per square meter over a 4 kc. slot. Considering the situation described above, one can see that even if the power density spectrum for full message loading is such that the power/m.$^2$ for the 4 kc. slot at the center of the assigned bandwidth is below the maximum allowable, it may rise above the maximum allowable as the message load decreases.

Increased power at the center frequencies, with an accompanying decrease in occupied bandwidth, results in a greater possibility of interference between the system of interest and other communication systems.

Furthermore, the above-described situation may result in carrier degradation due to peaked intermodulation spectrum near small carriers; the intermodulation process occurring in any non-linear elements of the satellite transponder or ground stations.

One prior art proposal for solving the problem is to add a triangular waveform to the composite message prior to carrier modulation. The triangular waveform swings the carrier linearly over the assigned bandwidth and maintains carrier dispersion even when the message load is low. However, that proposal suffers from the difficulty attendant to the selection of the triangular amplitude, or stated otherwise, the selection of the carrier dispersion due to the triangle alone. For example, if the amplitude is selected so that the triangle alone spreads the carrier over the assigned bandwidth, the addition of a message load will spread the carrier outside the assigned bandwidth. With full message loading, the carrier may be spread far outside the assigned bandwidth. On the other hand, if the triangle alone does not spread the carrier over the assigned bandwidth, then the presence of less than full message loading may create the same problems as described above in the absence of the triangular waveform except that the results will not be quite as serious.

In the present invention, the problems of the prior art are overcome with the result that there is always substantially full loading of the carrier due to the message plus triangular waveform combination, and the carrier will be spread over substantially the same bandwidth.

The foregoing and other objects, features and advantages of the invention will be apparent from the following more particular description of a preferred embodiment of the invention, as illustrated in the accompanying drawings.

Throughout the detailed description of the drawings, the invention will be described in an environment where the "message" is an FDM (frequency division multiplexed) composite message. However, it will be clear to anyone having ordinary skill in the art to which the invention pertains that the invention may be used in any "message" environment where it is desirable to maintain substantially constant loading of the F.M. carrier. As used herein, the term "message" refers to any information such as telephony, telegraphy, TV, data, etc.

Figure 1:
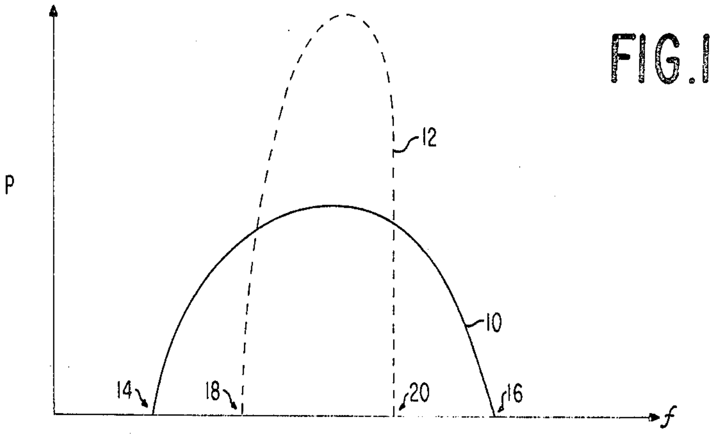
FIG. 1 is a graph of power versus frequency illustrating the problem existing in the prior art.

In FIG. 1, the horizontal axis represents frequency and the vertical axis represents power. A typical power density spectrum for the output of an F.M. transmitter with full message loading (assume a 120 channel allocation all of which are in use) is indicated by the solid curve 10. Normally, the carrier deviation is set to occupy the assigned bandwidth at full load, and thus as indicated in FIG. 1, the assigned bandwidth extends between points 14 and 16 on the frequency axis. When message loading decreases, for example, many channels are not in use, the power versus frequency or power density spectrum curve will appear compressed, such as is indicated by the dashed curve 12. The compression results because the composite message due to only partial loading will result in a lower amplitude signal being fed into the F.M. modulator with the consequent results that the carrier will not be spread over the entire allocated bandwidth. As indicated in the drawing, the carrier will now be spread over a bandwidth from point 18 to point 20 on the horizontal axis. With this decrease in the carrier dispersion the power density at the center frequencies must increase as indicated by the top portion of curve 12 due to the fact that the total power output remains substantially the same. Thus, since the system is set to occupy the assigned bandwidth at full loading, when less than full loading occurs the center frequencies will be transmitted at much greater powers resulting in the disadvantages described above.

In the present invention the increased power at the center frequencies at less than full message loading will not occur due to the addition of a triangular waveform whose amplitude is varied such that the RMS of the message plus the RMS of the triangle will be substantialy constant. Due to the varying of the triangular waveform amplitude and its addition to the composite message, the total maximum amplitude of the signal into the modulator will be substantially the same for all message loads and therefore will always spread the carrier over the allocated bandwidths. It should be noted that an average of the composite message signal is used to vary the triangular wave amplitude. Since the average will be substantially constant for a given number of channels in use the triangular waveform will take on a different value for each number of channels in use but will not vary in value unless the number of channels is varied. In other words, if 25 channels are in use the average composite message signal will take on a value which is proportional to 25 channels and will not change substantially from that value.

Figure 2:
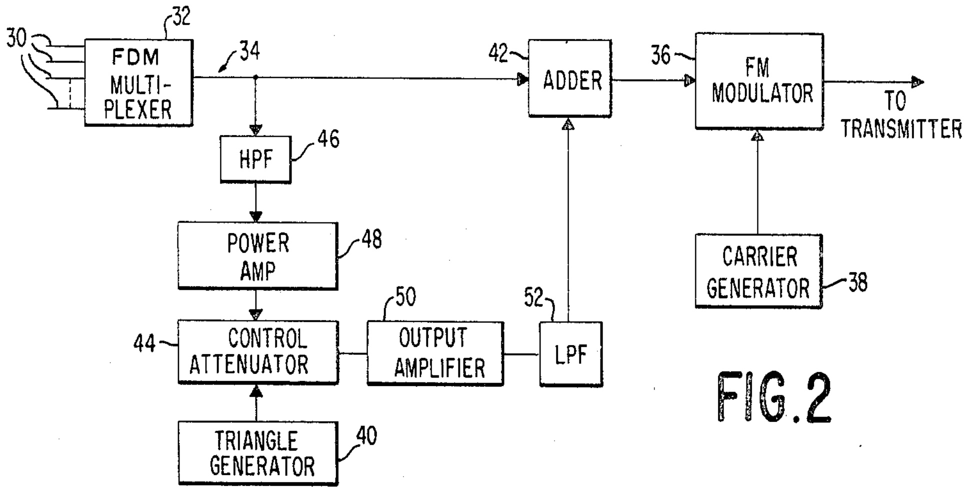
FIG. 2 is block diagram of a preferred embodiment of the invention.

A block diagram of a preferred embodiment of the invention is illustrated in FIG. 2 wherein the blocks represent functional units which are well known in the art.

As indicated in FIG. 2 a plurality of channels, 30, each carrying information are fed into a multiplexer 32, which may be referred to as an FDM mulitplexer, whose output is a composite message signal which appears on line 34. In the absence of the present invention, the composite message on line 34 would be fed directly to the F.M. modulator 36 which modulates the carrier frequency generated by carrier generator 38 in accordance with the composite message signal and provides a frequency modulated carrier output to the transmitter. Full loading of the system would occur when all of the channels, 30, are in operation, but as is well understood by those skilled in the art, there are numerous times when all of the channels are not in operation.

In order to maintain full loading even in the absence of a full message load a triangular waveform generated by triangular generator 40 is attenuated in accordance with the average of the message signal on line 34 and added to the composite message in adder 42 prior to modulating the F.M. carrier in F.M. modulator 36. In order to vary the amplitude of the triangular waveform, a control attenuator 44 has its control input connected to the message line 34 via a high-pass filter 46 and a power amplifier 48. The high-pass filter has a very high input impedance so that the composite message on message line 34 will not be appreciably attenuated. The high-pass filter 46 is set to pass all of the frequencies within the multiplex baseband and prevents any lower frequencies which may appear on line 34 due to the triangular waveform addition in linear adder 42, from passing to the control terminal of the control attenuator. The output of the high-pass filter passes through a power amplifier 48 of conventional type which amplifies the composite message signal and applies it to one input of the control attenuator 44. The triangular waveform from triangle generator 40 is applied to the other input of control attenuator 44.

The control attenuator 44 indicated in FIG. 2 provides two functions. It detects an average of the composite message, such as the RMS value of the composite message, and attenuates the triangular waveform input thereto in accordance with the average. In a preferred arrangement the attenuator may be preset to attenuate the triangular waveform down to a zero amplitude when the message on line 34 represents full loading. The attenuated triangular waveform output of the control attenuator 44 is applied through an amplifier 50 and a low-pass filter 52 to a linear adder 42 which may be any type of known linear adder, for example, a resistive network. The output of the adder represents the combination of the triangular waveform and the composite message and is fed to the F.M. modulator 36 for modulating the carrier frequency.

In the preferred embodiment described above a feed forward system provides control of the triangular waveform amplitude. However, it will be apparent to anyone of ordinary skill in the art that a feedback system may be used wherein the output of the adder controls attenuation of the triangular waveform; the important point in either case being that the average input to the F.M. modulator is substantially constant.

Although the preferred embodiment is described in conjunction with the use of a triangular wave shape as the locally generated waveform, it should be understood that although the triangular waveform is preferred, the invention can be carried out with the use of other waveforms. It is necessary that the added waveform be distinguishable from the composite message signal in the receivers. This can be done in a number of ways and in the case of frequency division multiplexing it can be easily done by using a triangular waveform having a frequency which is below the low end of the multiplex baseband. For example, in normal frequency division multiplexing systems the low end of the multiple baseband will be about 8 to 12 kilocycles. As long as the frequency spectrum of the triangular waveform is below to 8 to 10 kilocycle figure it can be separated out by filters in the receiver.

Figure 3:
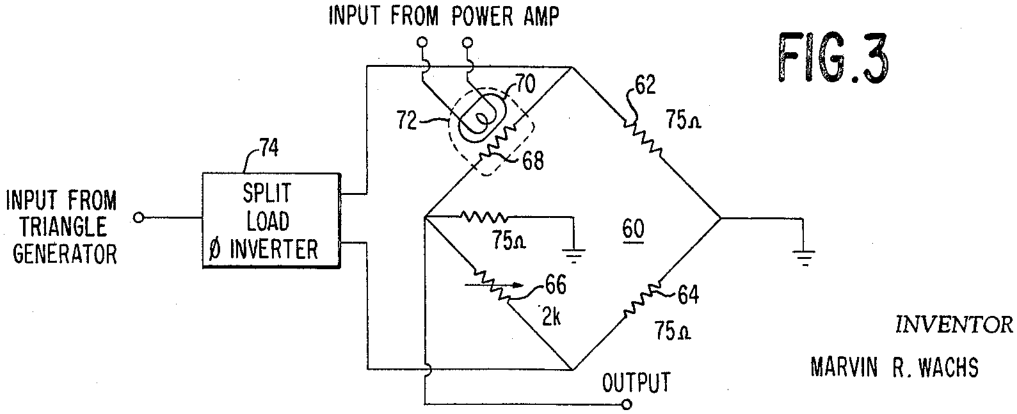
FIG. 3 is a schematic diagram of one example of a control attenuator which may be used in the invention.

As indicated above the invention will operate with any control attenuator which provides the two functions described. Many such circuits for performing those two functions are well known in the art. However, one preferred circuit for use as the control attenuator in the present invention is shown in FIG. 3. As shown in that figure the control attenuator includes a bridge 60 having bridge resistor 62, 64, 68 and 66. Resistor 68 is a photocell resistance whose resistive value varies with the light intensity produced by a bulb 70 which is energized by the output of power amplifier 48 (FIG. 2). The triangular waveform is applied to the bridge through a conventional split load phase inverter 74 and the attenuated triangular waveform appears at the output terminal of the bridge.

The bridge resistors 62 and 64 are identical in value and the variable bridge resistance 66 is set equal to the value of resistance 68 corresponding to maximum loading. That is, the bridge is set by varying the 2K resistor 66 so that the bridge will be balanced providing a zero output when the composite message represents full loading. During times when there is less than full loading the light intensity of the bulb 70 will decrease causing an increase in the value of resistor 68 thereby resulting in an unbalancing of the bridge 60. The more unbalanced the bridge, the less the triangular waveform is attenuated. The bulb 70 and photocell resistance 68 make up a lamp-photocell combination 72. The reason why the apparatus shown in FIG. 3 is preferred is because a light bulb is a very simple and inexpensive device which responds essentially to the RMS of the signal input thereto. Thus when the composite signal is applied to the input terminals of the light bulb, the light intensity is proportional to the RMS value resulting ultimately in an attenuation of the triangular waveform in accordance with the RMS of the composite message.

While the invention has been particularly shown and described with reference to a preferred embodiment thereof, it will be understood by those in the art that various changes in form and details may be made therein without departing from the spirit and scope of the invention.

What is claimed is:

1. In an F.M. communication system of the type which operates upon a composite message signal and has an F.M. modulator which frequency modulates a carrier signal in accordance with the signal applied to the modulating input thereof, a system for maintaining an average of the voltage of the signal applied to said modulating input substantially constant comprising, (a) waveform generating means for generating a waveform having a characteristic distinguishable from said composite message signal, (b) attenuating means connected to said waveform generating means and responsive to an average of the voltage of said composite message signal for attenuating said waveform an amount proportional to said average voltage of said composite message signal, (c) adder means connected to said attenuating means and responsive to said composite message signal for adding said attenuated waveform to said composite message signal, and (d) means for connecting the output of said adder means to said modulating input.

2. The combination as claimed in claim 1 wherein said waveform generating means is a triangular waveform generator.

3. The combination as claimed in claim 1 wherein said attenuating means attenuates said waveform in accordance with the RMS of said message.

4. The combination as claimed in claim 2 wherein said attenuating means attenuates said waveform in accordance with the RMS of said message.

5. The combination as claimed in claim 1 wherein said attenuation means comprises, (a) a resistance bridge having a photocell resistance forming one leg of said bridge, the input terminals of said bridge being connected to said waveform, the output terminals of said bridge being the output of said attenuation means, and (b) a light bulb responsive to said composite message and positioned to illuminate said photocell resistance with the light therefrom.

6. The combination as claimed in claim 4 wherein said attenuation means comprises, (a) a resistance bridge having a photocell resistance forming one leg of said bridge, the input terminals of said bridge being connected to said waveform, the output terminals of said bridge being the output of said attenuation means and (b) a light bulb responsive to said composite message and positioned to illuminate said photocell resistance with the light therefrom.

7. The combination as claimed in claim 1 wherein said message is provided from the output of a multiplexer.

8. The combination as claimed in claim 6 wherein said message is provided from the output of a multiplexer and the waveform frequency is below the lowest frequency in the multiplex baseband.

References Cited

UNITED STATES PATENTS

| | | | |
|---|---|---|---|
| 2,050,737 | 8/1936 | Schriever | 332—47 X |
| 2,773,220 | 12/1956 | Aron | 332—3 X |
| 3,162,801 | 12/1964 | Bogotch et al. | 332—38 X |
| 3,271,679 | 9/1966 | Fostoff | 325—62 X |
| 3,363,188 | 1/1968 | Gardere | 332—41 X |

FOREIGN PATENTS

| | | |
|---|---|---|
| 206,004 | 6/1956 | Australia. |

ALFRED L. BRODY, Primary Examiner

U.S. Cl. X.R.

325—45, 162, 185, 187; 332—21, 19; 328—173